E. A. SPERRY.
GYROSCOPIC APPARATUS.
APPLICATION FILED JULY 11, 1912.

1,186,856.

Patented June 13, 1916.
5 SHEETS—SHEET 1.

WITNESSES:

INVENTOR
Elmer A. Sperry,

ATTORNEY

E. A. SPERRY.
GYROSCOPIC APPARATUS.
APPLICATION FILED JULY 11, 1912.

1,186,856.

Patented June 13, 1916.
5 SHEETS—SHEET 3.

WITNESSES

INVENTOR
Elmer A. Sperry,
ATTORNEY

UNITED STATES PATENT OFFICE.

ELMER A. SPERRY, OF NEW YORK, N. Y., ASSIGNOR TO THE SPERRY GYROSCOPE COMPANY, OF BROOKLYN, NEW YORK, A CORPORATION OF NEW YORK.

GYROSCOPIC APPARATUS.

1,186,856.  Specification of Letters Patent.  Patented June 13, 1916.

Application filed July 11, 1912. Serial No. 708,809.

*To all whom it may concern:*

Be it known that I, ELMER A. SPERRY, a citizen of the United States of America, and residing at New York, in the county of Kings and State of New York, have invented new and useful Improvements in Gyroscopic Apparatus, of which the following is a specification.

This invention relates to gyroscopic apparatus and has for its object, among others, to construct such an apparatus which may be used for the determination of angles as between the fixed frame and the oscillating support of the apparatus, or which may be used as a reference platform for the control of the stability of unstable objects. My idea is to provide a reference line or plane which is fixed in space so that it may be used to govern automatically the movements of a body, such as torpedoes, air craft or the like.

A further object of this invention consists in constructing a gyroscopic apparatus so that it may be free to take up motion from all, or any one, or a combination of primary components of a universal or angular motion, for the determination or study of one or more single components of a compound motion to the exclusion of the others.

This invention consists, furthermore, in constructing an apparatus which is possessed of qualities similar to massive weights suspended from various heights, but which avoids the use of actual masses of large magnitude and very long suspensions.

My invention also consists in providing means connected with such apparatus whereby the adjustment of the same may be effected without waiting for the apparatus to stop its periodic motion and without imparting any strains or stress on the pivots of the apparatus when such adjustment is being made. Furthermore, the rate of oscillation may be varied independently of the change in speed of the wheel or wheels themselves in order to synchronize the oscillation of the apparatus with other oscillations as may be desired.

My invention further consists in providing a gyroscopic apparatus in which ballistic disturbances may be overcome and still leave my apparatus oscillatory and pendulous.

In connection with my apparatus I employ level indicators for indicating elevation, which is very important for determining positions of the gyroscopic apparatus with regard to a certain given line.

This invention further consists in securing equality in speeds of the rotating members of the gyroscopic apparatus when more than one gyro is used by interconnecting and regulating the vacuum in the casings in which the rotors operate and further regulating the electrical supply causing the rotors to operate.

I have pointed out the principal among the objects and advantages of my gyro apparatus. I will now describe, for sake of illustration, one or more simple forms in which the apparatus may be embodied.

Referring to the drawings: Fig. 3ª is a partial section and elevation showing the bearings and method of supporting a gyro as in Fig. 3. Fig. 9, is a plan view and partial section

The apparatus consists of one or more spinning masses organized for precession upon pivots in a supporting frame or case which in turn is mounted for oscillation upon an axis at a substantial angle and which is normal to the precessional axis or axes when the gyros stand in their central or mean positions. When the apparatus is used for controlling or observing the stability of a body about either or both of the horizontal axes, I place the aforesaid axis of oscillation substantially horizontal, but of course, where the apparatus is to be used to observe turning about other axes or to control the movements of a body about such axis, such as steering in azimuth, the position of the axis of oscillation is varied accordingly.

The invention in its preferred form contemplates the use of one or more pairs of gyros but there are certain features of construction and principles of operation applicable to an apparatus embodying a single gyro which will be first referred to.

In its preferred form, the apparatus comprises a pair of gyro-elements coupled for equal and opposite precession in a pivoted frame common to both, the whole operating as a unit and being so arranged that the frame participates in all movements of its support except angular movement about one particular axis.

A frame 15 is suitably mounted from any form of support as for instance, in the bearings 16, 16 upon a common support A so as to be capable of oscillation. A precessional ring 17 is supported within the frame 15 for instance, as by pivots 18, 18. The precessional ring 17 carries the spinning mass consisting of a rotor 19 mounted on shaft 20. The precessional ring also usually carries a motor or a connection to a motor for driving the rotor which however is not shown in Fig. 1. The frame 15 may also carry means for tilting the precessional ring and in Fig. 1 this consists of a knob 21 extending through the frame 15 and having a crank arm 22 connected by a link 23 to the ring 17 so that rotation of the knob 21 will tilt the ring 17 about its pivots 18, 18. By means of this knob 21 it is possible to apply a stress to both the frame and the precessional ring and thus make it possible to control the movement of the frame 15 while at the same time leaving the ring 17 in any desirable relative position to the frame.

Under some conditions it is desirable to retard or alter the relative freedom of movement of the precessional ring or to hold it stationary relative to the frame. This may be accomplished in various ways some of which I have illustrated. In the diagrammatic illustration of Fig. 1 this is accomplished by means of a pulley 24 attached to the ring 17 and a band or cord 25 which has one end fixed to the frame 15 and the other end secured to a shaft 26 having a knob or handle 27 supported in the frame. By turning the handle or knob 27 and tightening or loosening the band 25 and thus increasing its friction on the pulley 24, it is possible to control the relative freedom of movement of the precessional ring and thus for instance, vary the period of oscillation of the apparatus. In this way it can be given periods of vibration which can be controlled and which can be brought into synchronism with any other oscillating device.

Figure 1:
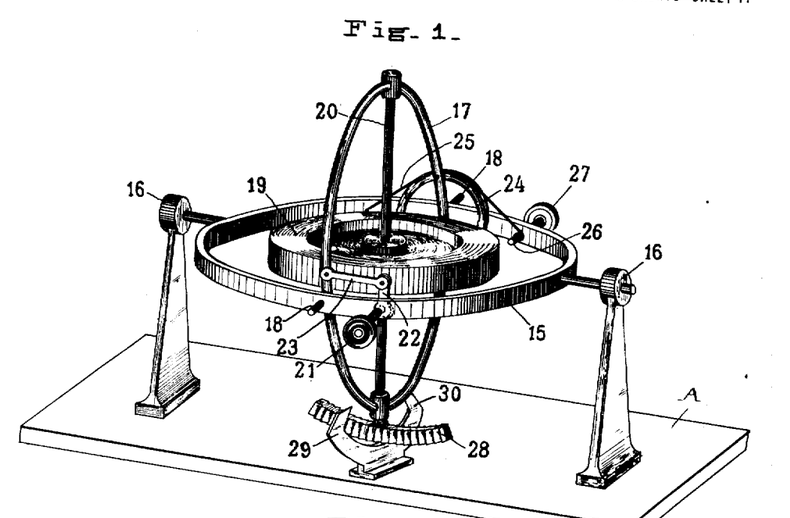
Figure 1, is a perspective view of a simple form of apparatus with one gyro and illustrating certain features of my invention.

Sometimes it is desirable to arrest the oscillation of the apparatus as a whole. It is found especially where the apparatus is mounted upon a moving body that an abutment must not be made directly upon the frame or main member 15 because of extraordinary strains that are thus produced. This may be avoided by causing abutment to be made rather with the precessional ring or some portion thereof or attachment thereto and in this event it is desirable that this abutment should perform the additional function of arresting the individual motion of the ring itself. To this end there is in this instance, provided a double faced ratchet 28 which in Fig. 1 is shown as secured to the lower part of the precessional ring 17, the teeth facing in opposite directions and being such as to arrest the motion of the precessional ring 17 upon its pivots 18 within the frame 15. The engaging pawl in the arrangement shown in the figure is suitably secured as to the same body or support A upon which the apparatus as a whole is mounted. The stationary abutment or pawl consists of two teeth 29 and 30 which are shown as a part of a unitary device but which may be separate and adjustable for the purpose of permitting a variation in the oscillation of the apparatus. An essential of this feature is that it should be at some distance from both pivots 18 and 16 as will be more clearly understood hereinafter. It may be understood that this apparatus as a whole is rendered pendulous by the presence of the part 28 depending from the inner member or ring 17. The frame 15 and its parts may be otherwise in equilibrium upon its pivot 16; this arrangement at the same time serving to centralize the precessional ring by rendering the same independently pendulous. When the frame 15 tilts on its axis the inner frame 17 of course tilts with it and also precesses on its pivots 18. The rack 28 is thus brought into engagement with one of the stops 29 or 30 which not only stops the tilting action about the axis of the bearing 16 but also stops the precessional action about the pivots 18.

Figure 2:
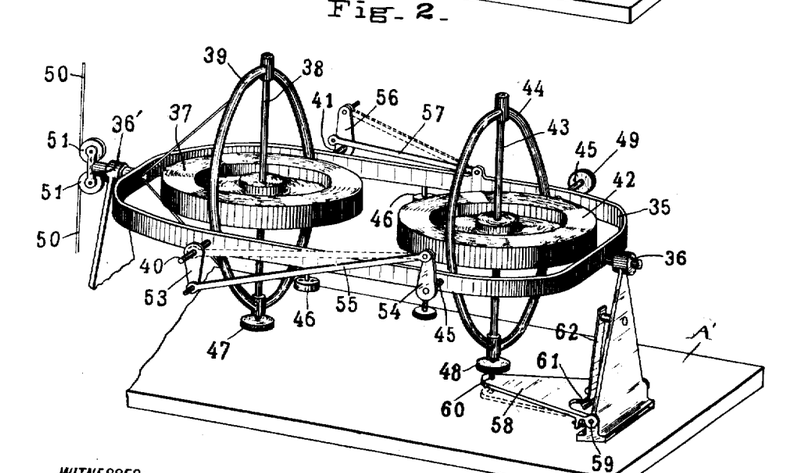
Fig. 2 is a similar perspective view of an apparatus embodying features of my invention including two gyros.

In the form shown in Fig. 2 the apparatus has two gyros mounted in a frame 35 which is supported in suitable bearings such as 36, 36' on a common support A' to permit oscillation. The rotor 37 has a shaft 38 supported in the precessional ring 39 which has pivots 40 and 41 in the frame 35. The rotor 42 has a shaft 43 supported in the ring 44 which has pivots 45, 45 in the frame 35. The frame 35 may be rendered pendulous by means of one or more weights such as 46, 46 and the precessional rings are rendered pendulous for instance, by means of weights such as 47 and 48. In all the figures in which I employ coupled pairs of gyros, it should be noted that the rotor frames 39 and 44 are so pivoted on the common supporting gimbal 35 as to offer no resistance to tilting movements about any axis except the axis on which the gimbal ring is supported, and since no torque can be applied about this axis between the support and the gyros except the slight torque due to friction, it will be seen that the apparatus will not of itself stabilize the support upon which it is placed, but will freely participate in all motions of this support about all axes, except one, and will remain in a fixed position with respect to that axis, but will not interfere with the motions of the support about that axis. In this figure I have shown two different means for applying stress to the precessional rings for the purpose of controlling the frame. The knob or handle 49 on the pivot of the right hand gyro serves to apply the tilting stress upon the precessional ring 44. The precession of the left hand gyro may be effected by means of the cords 50, 50 passing over the pulleys 51, 51 through the hollow shaft 36' and connected to the upper and lower portions of the precessional ring 39. The two precessional rings are coupled together so as to have equal and opposite precessional movement. In the form shown in Fig. 2 the connection is effected by cranks 53 and 54 on the respective pivots of the precessional rings and the connecting rod 55. The two precessional rings may be rendered independent in their action by disconnecting the rod 55, for instance, from the crank 53. On the other hand the precession of the ring 44 may be prevented by simply attaching the left hand end of the rod 55 to the pivot 40 as shown in dotted lines. The pivot 41 is provided with a crank 56. A rod 57 connected at one end to the frame 35 is adapted to be connected to the outer end of the crank 56 as shown dotted, so that precession of the ring 39 may be prevented when desired. It will be thus noted that if the two precession rings are connected together by the rod 55, the connection of rod 57 to the crank 56 will prevent precession of both rings. The ring 44 however, may be permitted to have independent precession by disconnecting the rod 55 from the crank 54 even though the ring 39 is prevented from precession by the rod 57 or otherwise. To prevent movement of the frame 35 I provide a movable abutment 58 which is pivoted at 59 and adapted at its outer end to engage a projection 60 from the lower portion of the precession ring 44. The member 58 has a shoulder 61 engaged or adapted to be engaged by a spring 62 so that the member 58 may be yieldingly held in the position shown in full lines in Fig. 2 or in the position shown in dotted lines in which latter position it is out of engagement with the precessional ring 44. This abutment when in operation at the same time serves to hold one or both precessional rings from motion within the frame 35 depending upon whether or not the rings 44 and 39 are disconnected or connected.

Figure 3:
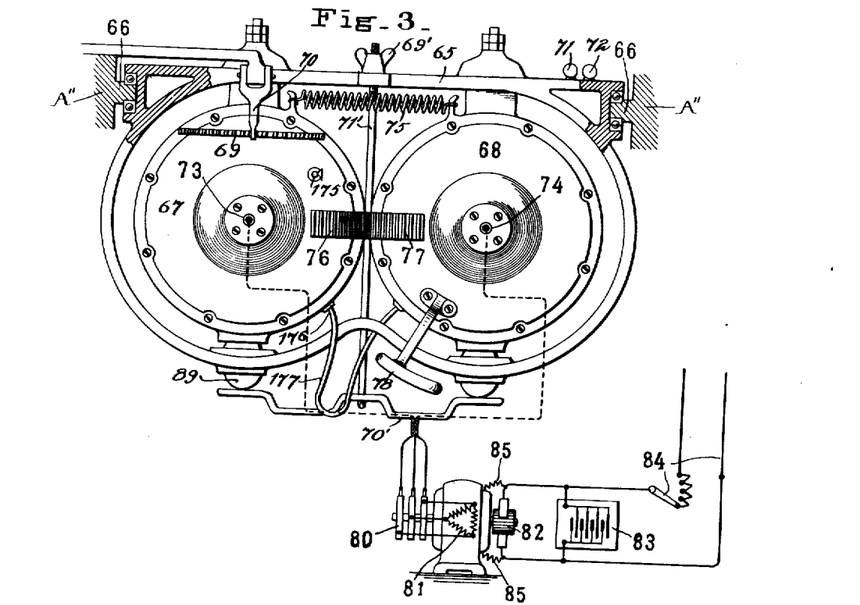
Fig. 3, is a diagrammatic elevation and partial section of apparatus containing two gyros and with a source of electric power, the spinning axes of the gyros being horizontal.
Figure 3A:
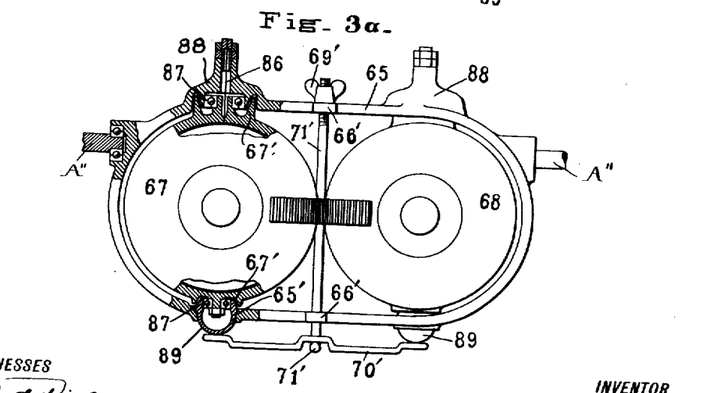

In the form shown in Fig. 3 the frame 65 is supported in bearings at 66, 66 on a common support A'' and the disposition of the masses of the frame and parts carried by it is such that the frame is pendulous. The precessional rings in this form of construction consist of casings 67 and 68 having pivotal supports in the frame 65. The oscillation of the frame 65 and the casing 67 may be checked by engaging the rack 69 on the casing 67 by an arm 70 carried by the main support. The rotors are mounted on bearing members 73 and 74 in the precessional casings 67 and 68 respectively. The construction of the rotors and casings may be illustrated more in detail in Fig. 10 and hereinafter described. The axes of the rotors are normally horizontal and parallel. A spring 75 in the form shown is connected to the two casings 67 and 68 by knife-edge bearings located between the pivots 87 so as to apply tension to the casings and thereby "centralize" them—that is tend to return them to their normal central position from either direction. The precessional casings 67 and 68 are respectively provided with segmental racks or gears 76 and 77 which couple the casings together so that the precession of the casings is equal and opposite. In this instance it will be understood that the rotors within the casings spin in opposite directions and at substantially equal speeds, in case the gyro moments are equal, but in case they are not equal, then at such relative speeds to produce equal and opposite gyro moments.

According to these figures, it will be noted that the gyroscopes may be and preferably are statically balanced on their precession axes, since one end of the gyroscope need not be made heavier than the other to centralize the gyros, as is done in Fig. 2. This construction affords an important advantage over the other, since it abolishes the troublesome effects of acceleration forces acting directly on the gyros within the frame, which tend to cause a movement of the main frame.

A handle 78 is secured to one of the precessional casings for instance, the casing 68, so that stress may be applied to the precessional casings for controlling the movement of the frame as previously referred to in regard to the construction shown in Figs. 1 and 2. In this instance the controlling handle, it will be noted, is connected to the frame 65 indirectly through the casing 68 and suitable pivots.

For the purpose of synchronous spinning of the rotors of the gyros, means are shown in Fig. 3 for electrically driving them from a common source of electrical supply, in this case the same being preferably three phase alternating current. It will thus be seen that an equal number of cycles may be impressed on each rotor. In the arrangement shown a group of slip rings are shown at 80 connected with a single armature winding 81 which is also connected to a D. C. commutator 82 supplied with the usual commutator brushes and shown as being connected to two sources of electrical D. C. supply, one being a storage battery 83 and the other being the usual constant potential D. C. supply mains 84. A single applied winding 85 is shown as in proper circuit relation. The advantage of this arrangement is that it insures stability of gyro rotors against over-speeding and it has been found in practice that no abnormal condition of this combination can arise which will injuriously increase the speed.

The rigidity of the frame 65, or corresponding frame in the other arrangements, depends upon the state of freedom of the pivots, which in this case are the suitable vertical pivots. That these may attain the maximum sensitiveness, I have adopted an arrangement consisting of a supporting filament 86, which may be so constructed as to perform the function of the torsion member, or automatic centralizing device. In this case they will either aid or displace entirely spring 75. When the filament 86 is substantially torsionless the gyros themselves are unstrained as they are where no centralizing feature is shown. Roller bearings, 87, are secured to the stem of the gyros 67 and 68, both above and below, and are slidably secured within the recesses in the crowns 88 rising from the frame 65. In this frame below there are moving plungers 89—89 receiving the bearings. Conical faces 67' are provided to receive, centralize and lock the gyros within the frame 65, relieving all the bearings 87 and the suspension 86 by the simple act of raising the plunger 89 within the bore 65', within which it slides freely vertically. An equalizing lever 70' is supported at its center by the T head of bolt 71', which passes up each side of the frame 65, being guided both above and below by ears 66' and secured to some elevating mechanism as thumb screw 69' by the turning of which the whole gyro may be elevated and locked upon the conical faces 67', as will be readily understood from the drawing. They are usually secured in this way while either out of service or being shipped.

Figure 4:
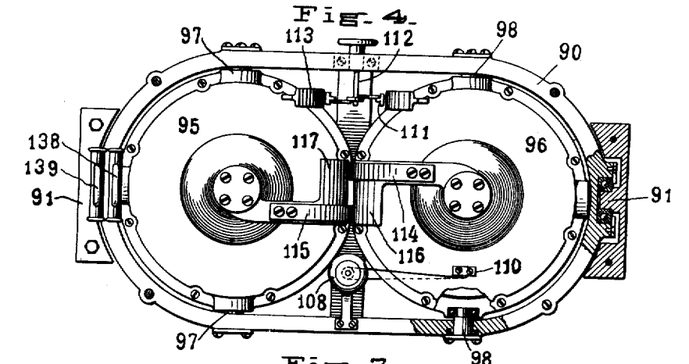
Fig. 4 is a plan view and Fig. 5, is a side elevation, both in partial section, of apparatus including a pair of gyros with vertical spinning axes.
Figure 5:
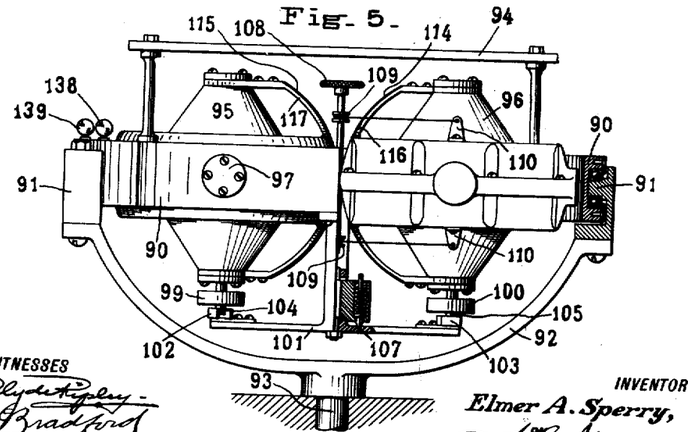
Figure 6:
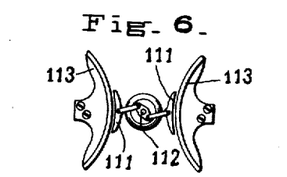
Fig. 6, is a fragmentary detail of a brake interposed between the precessional frames of the gyros of Figs. 4 and 5.
Figure 7:
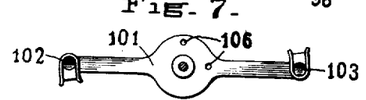
Fig. 7, is a detail view of a device for holding the precessional frame or frames of the gyros.

In the form shown in Figs. 4 and 5 the outer frame 90 has a horizontal axis and bearings at 91, 91 which bearings are carried for instance, by a rotatable support 92 supported in a step bearing 93 so that the entire frame can be turned about. This also shows a platform 94 supported by the frame 90 and extending over the frame and the precessional casings 95 and 96. These casings have horizontal axes and pivots at 97 and 98 respectively. The casings are rendered pendulous by means for instance, of weights 99 and 100. These pendulous fittings may constitute the only out-of-balance feature of the apparatus as a whole, including the frame 90 and platform 94 and attached parts. An arresting device 101 in this form is pivotally attached to the lower part of and moves with the frame 90 and has engaging members 102 and 103 adapted respectively to engage the projections 104 and 105 on the lower ends of the precessional casings. This arresting device is adapted to be operated by hand and is provided with two notches 106 adapted to receive a spring pressed plunger 107 to yieldingly hold the arresting device in position for arresting the precessional frame or in position free therefrom. For applying stress to the precessional ring and controlling the frame I have shown in this form of device a handle or knob 108 on a shaft having pulleys or spools such as 109, 109 which are connected by cords or chains to the lugs 110, 110 on one of the precessional casings so that by rotating the handle 108 the casings may be placed under stress. For the purpose of effecting the precessional velocity of the casings I have shown a pair of brake shoes 111, 111 coupled to an operating shaft 112 and I have provided the casings with friction surfaces 113, 113 adapted to be engaged by the brake shoes 111 when the shaft 112 is turned. In this form of construction the rotor axes are vertical and the precessional casings are coupled by means of flexible bands such as 114 and 115 so that the precession shall be equal and opposite, the bands being supported on cylindrical bearing surfaces 116 and 117 on the casings.

Figure 8:
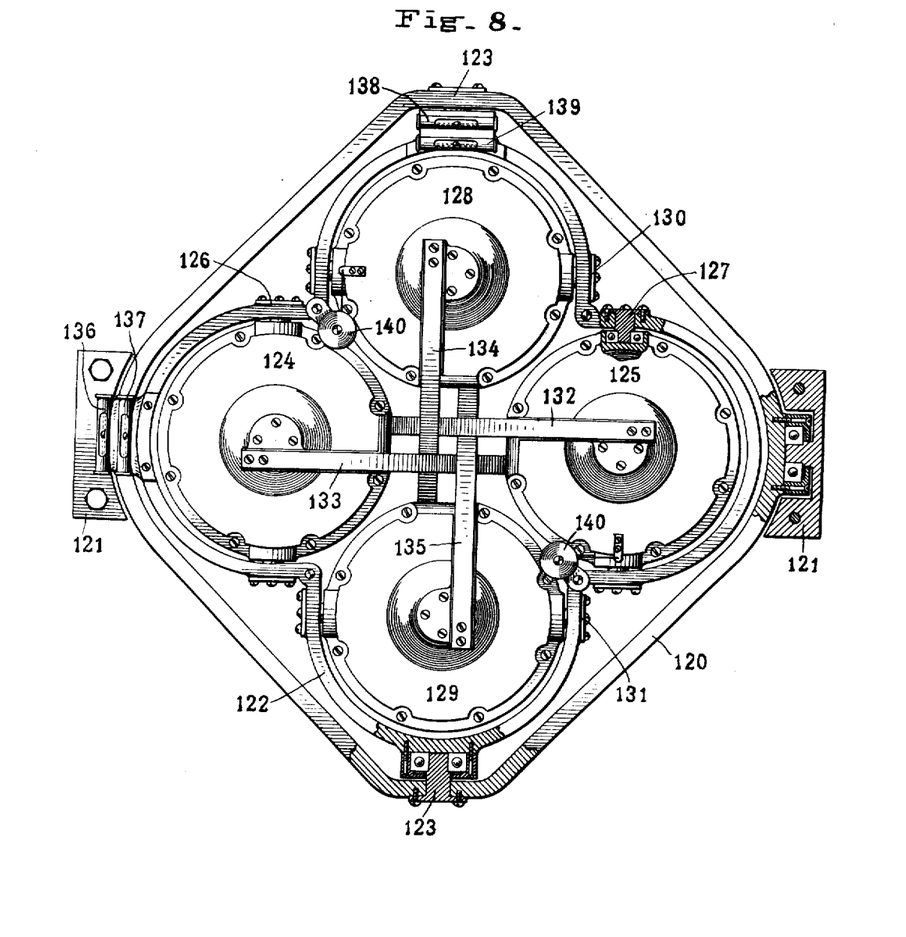
Fig. 8, is a plan view and partial section of apparatus embodying features of my invention with two pairs of gyros, the precessional axes of the two pairs being at right angles to each other.

The construction shown in Fig. 8 is similar in some respects to that shown in Fig. 2.

The frame 120 has a horizontal axis and is supported in bearings at 121, 121 and carries a plurality of pairs of gyros in this instance two pairs. An inner frame 122 is supported in the outer frame 120 in bearings at 123, 123. The axes of the two frames are at right angles to each other. Two pairs of gyros are provided so as to stabilize the apparatus in two planes, in this case, at right angles to each other. The precessional casings 124 and 125 have the axes of their pivots at 126, and 127 parallel to each other while the precessional casings 128 and 129 have the axes of their pivots at 130 and 131 parallel to each other and at right angles to the first mentioned pair. The rotors all normally spin in a horizontal plane, their axes being normally vertical and therefore all parallel. The casings 124 and 125 are coupled by bands 132 and 133, while casings 128 and 129 are coupled by bands 134 and 135 for the purpose of insuring equal and simultaneous deviation from the normal parallel condition of the spinning axes.

As one means for indicating the position of the apparatus I have illustrated in Fig. 8 levels preferably compound, as for instance, 136 and 137 and the levels 138 and 139 all mounted on the inner frame 122 and arranged in pairs at right angles to each other. By using two or more levels of differing degrees of sensitiveness in the two positions at right angles to each other, it is possible to much more quickly and accurately bring the apparatus to the position desired. The coarser levels always remain in the field of vision and serve to interpret the adjacent and more sensitive level or levels. A pair of levels is also shown in Fig. 3 at 71 and 72 on the main frame 65.

Any suitable means for inducing artificial precession of the casings may be employed such for instance, as previously illustrated and described in referring to Figs. 4 and 5, in this case the controlling handle being indicated at 140. The compound group of gyros illustrated in Fig. 8 may be provided with suitable means for arresting the precession or locking the casings as previously described.

Figure 9:
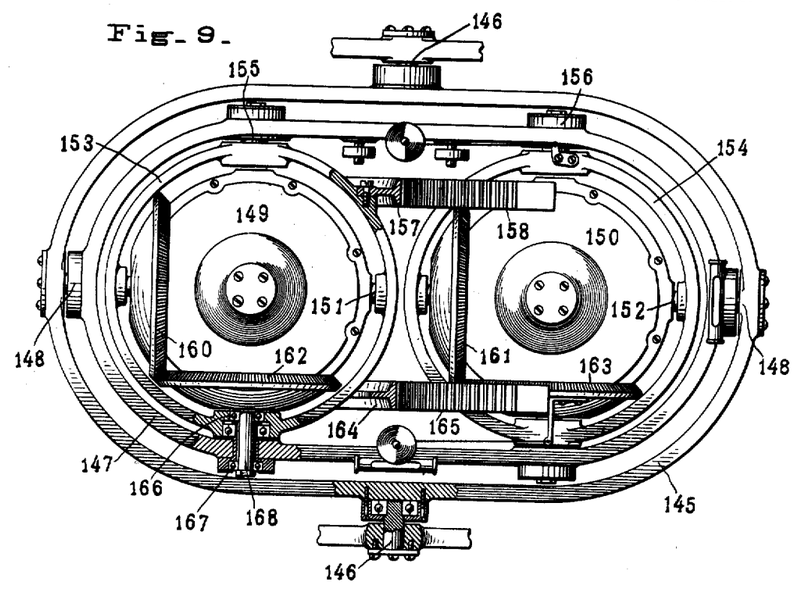
Figure 10:
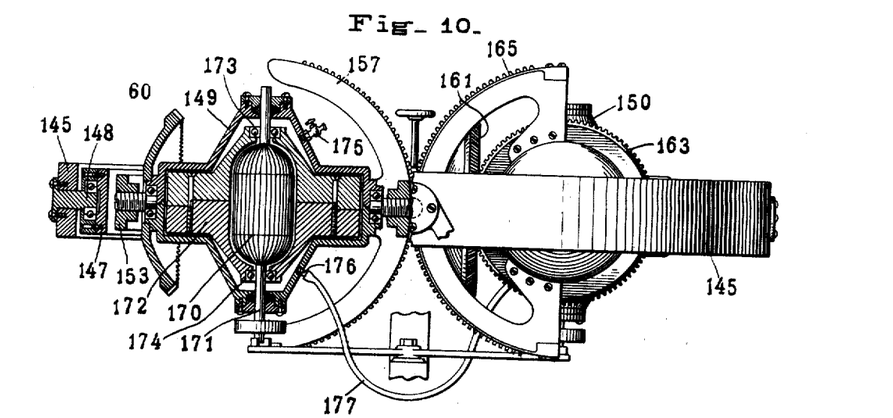
Fig. 10, is a side elevation and partial section, of gyroscopic apparatus containing one pair of gyros and coupled for precession in two planes at right angles to each other.

In the form shown in Figs. 9 and 10 a single pair of gyros performs the function of the plurality of pairs referred to in Fig. 8 by being coupled together so as to have equal and opposite precession upon two axes at right angles to each other, both being within the Cardan frame. The frame 145 has a normally horizontal axis and is supported in bearings at 146. An inner frame 147 also normally has a horizontal axis supported in bearings at 148 in the outer frame. The axes of the two precessional casings 149 and 150 are normally horizontal and parallel and in this instance are normally in alinement. The bearings at 151 and 152 are carried respectively by frames 153 and 154 which frames are pivotally supported in bearings at 155 and 156 carried by the frame 147. The pivotal axes of the frames 153 and 154 are normally horizontal and parallel and at right angles to the axes of the precessional casings. In this case the rotors are mounted on parallel axes normally vertical and the rotors are spun in opposite directions at equal speeds or at such speeds as will produce equal gyro moments. The two rings 153 and 154 which support the precessional casings are coupled together as for instance, by means of segmental racks or spur-gears 157 and 158 so that they are always oscillated in opposite directions and through equal angles. The precessional casings 149 and 150 are also coupled together so as to have equal and opposite precession. Attached to or movable with the casings 149 and 150 are the bevel pinions 160 and 161 meshing with the bevel pinions 162 and 163. Connected to the two latter bevel gears are segmental spur-gears 164 and 165 which are in mesh so that when the casings 149 and 150 precess they necessarily precess through equal and opposite angles by reason of the gear train just described. It will be noted in this connection that the precessions of the casings on their pivots 151 and 152 are not independent of the frame 147 but the stresses are transmitted thereto through bearings 166 and 167 connected either directly or indirectly therewith. These bearings 166 and 167 in the frames 153 and 147 serve to maintain the alinement and support the short idler shaft 168 of the gears 162 and 164. Gear 163 is supported in the same manner as gear 162. The frame 147 may be, if desired, provided with a system of indicators for instance, levels, as previously referred to and also with means for impressing stress upon the gyros in the plane necessary for controlling the movement of the frame in two directions.

In Fig. 10 I have indicated a construction of motor for creating the spinning moments, in this case, by stress of a relatively stationary A. C. stator 170 whose coils are mounted on the shaft 171 in the casing 149. The rotor 172 is supported in bearings 173 and 174 on the shaft 171.

In Figs. 3, 9 and 10 the casings are shown to be vacuum casings, ordinary packing glands being used at points where the shaft of the stator emerges from the precessional casings, see 149—150 Fig. 10. Secured to these casings are valved nozzles 175, by means of which they may be evacuated; and at 176—176 are shown corresponding nozzles which are connected by flexible tube or hose 177, connecting the casings, as for instance 67—68 and 149—150, whereby an equal vacuum is maintained in each, thereby permitting an equal impressed force upon each of the stators, one of which is clearly seen to the left in Fig. 10, to impart equal rotative speeds to the rotor, also shown in section in this portion of the figure.

What I claim is:—

1. In a gyro apparatus, the combination with a gyroscope having the usual precession frame and axis and primary axis of oscillation, of a device for controlling said gyroscope comprising a stop adapted to engage said frame so as to prevent a relative motion thereof about both the precession and primary axes.

2. In gyro apparatus of the character described a frame mounted upon a support for oscillation relative thereto, a gyro mounted thereon for oscillation relatively to the frame, the axes of the frame and gyro lying normal to each other, a device as a stop or abutment attached to the support for preventing or arresting motion of the system, the engagement between the system and the device being located upon the pivoted gyro within the frame, the device arranged to simultaneously arrest the oscillating motion of the gyro and also that of the frame upon their respective axes.

3. In gyro apparatus of the character described a frame mounted upon a support for oscillation relative thereto, a plurality of gyros mounted thereon for oscillation relatively to the frame, the frames being connected for predetermined relative motion, a device as a stop or abutment attached to the support for preventing or arresting motion of the system, the engagement between the system and the device being at a point upon one of the pivoted gyros within the frame and organized to simultaneously arrest the motion of both the gyros and the frame upon their respective axes.

4. In gyro apparatus, a support, a frame which together with its contained parts is pendulous mounted upon said support for oscillation relative thereto, a pair of gyros pivotally mounted upon said frame upon substantially parallel axes and means connecting said gyro whereby only opposite precession is permitted.

5. Means for stabilizing a pendulously mounted body about an axis comprising a pair of gyroscopes mounted on said body for precession about substantially parallel axes which are substantially perpendicular to said first mentioned axis, the spinning axes of the gyros being normally at a substantial angle to each of said other axes, means connecting said gyros whereby only opposite precession is permitted and yielding means for applying torques about the precession axes whenever the spinning axes depart from their normal position.

6. In gyro apparatus of the character described a frame mounted upon a support for oscillation relative thereto, a pair of gyros and precessional members therefor mounted to oscillate upon parallel axes upon the frame, the said axes being at a substantial angle to the spinning axis of each gyro and resilient means for centralizing the two gyros upon their oscillating axes.

7. In gyro apparatus of the character described a pendulous frame pivoted to a support, a plurality of gyros each having a precession ring pivoted within the frame at a substantial angle to the pivotal axis of the frame and also to the spinning axis of the gyros, the pivots of the two precession rings upon the frame being parallel to each other and means for moving said outer frame upon its pivots by applying angular stresses to each of the said precession rings of the gyros.

8. In gyro apparatus of the character described a frame pivoted to a support, a pair of gyros each having a precession ring pivoted within the frame at a substantial angle to the pivotal axis of the frame and also to the spinning axis of the gyros, the pivots of the two precession rings upon the frame being parallel to each other and means for coupling the said precession rings for predetermined relative angular velocity upon their pivots within the frame.

9. Gyro apparatus, comprising a frame pivoted upon a support upon a horizontal axis, a pair of gyro elements independently pivoted upon and coupled for equal and opposite precession upon said frame, the whole being pendulous and operating as a unit and being so arranged that the frame freely participates in all movements of its support except angular movement about its pivotal axis of support.

10. In gyro apparatus of the character described a pendulous frame pivoted to a support, a gyro with a precession ring pivoted within the frame at a substantial angle to the pivotal axis of the frame and also to the spinning axis of the gyro, means for moving the said outer frame on its pivots by applying angular forces to the said precession ring of the gyro, and an indicator of position suitably mounted upon the apparatus for indicating motions thereof.

11. In gyro apparatus of the character described a pendulous frame pivoted to a support, a plurality of gyros each having a precession ring pivoted within the frame at a substantial angle to the pivotal axis of the frame and also to the spinning axis of the gyros, the pivots of the two precession rings upon the frame being parallel to each other, means for moving the said outer frame on its pivots by applying angular forces to the said precession rings of the gyros, and an indicator of position suitably mounted upon the apparatus for indicating motions thereof.

12. In gyro apparatus, the combination with a pair of electrically driven rotors arranged to spin *in vacuo* and to balance each other in their gyroscopic reactions, of means for maintaining said rotors at exactly the same speed comprising a duct connecting the evacuated casings of the rotors to equalize the pressure in the casings.

13. In gyro apparatus, the combination with a pair of electrically driven rotors arranged to spin *in vacuo* and to balance each other in their gyroscopic reactions, of means for maintaining said rotors at exactly the same speed comprising a duct connecting the evacuated casings of the rotors to equalize the pressure in the casings, and a common alternating current generator adapted to supply each rotor, whereby said rotors are kept in step.

14. In gyro apparatus of the character described a plurality of gyros, the wheels or rotors of which are each provided with means for driving same, consisting of an alternating current stator, a common alternating current generator connected with each stator, the relation of the magnetic properties of the various stators taken together with the frequencies of the generator being such as to produce equal speeds of rotation of the said rotors.

15. A gyroscopic apparatus for stabilizing a line comprising a pivoted support, a pair of rotors pivoted for oscillation upon said support about parallel axes at right angles to the normal position of their spinning axes, each of said rotors being statically balanced about said oscillatory axis, and means for centralizing said rotors upon said axes, the apparatus as a whole being pendulous.

16. A gyroscopic apparatus for stabilizing a line, comprising a support, a pair of rotors pivoted for oscillation upon said support about parallel axes perpendicular to the normal position of their spinning axes, each of said rotors being statically balanced about said oscillatory axis, and a centralizing spring connected to said rotors so as to exert a torque about said oscillatory axis upon their being displaced from a parallel position, the apparatus as a whole being pendulous.

17. A gyroscopic apparatus for stabilizing a line, comprising a support, a pair of rotors pivoted for oscillation upon said support about parallel axes perpendicular to the normal position of their spinning axes, each of said rotors being statically balanced about said oscillatory axis, coupling means between said rotors whereby equal and opposite oscillation only is permitted, and means for centralizing said rotors upon said axes, the apparatus as a whole being pendulous.

18. A gyroscopic apparatus for stabilizing a line, comprising a support, a pair of rotors pivoted for oscillation upon said support about parallel axes perpendicular to the normal position of their spinning axes, each of said rotors being statically balanced about said oscillatory axis, coupling means between said rotors whereby equal and opposite oscillation only is permitted, a centralizing spring connected to said rotors so as to exert a torque about said oscillatory axis upon their being displaced from a parallel position, the apparatus as a whole being pendulous.

19. In gyro apparatus of the character described a frame pivoted to a support, a gyro with a precession ring pivoted within the frame at a substantial angle to the pivotal axis of the frame and also to the spinning axis of the gyro, the said gyro being statically balanced upon its pivots, and restraining means connected thereto for returning same upon its pivots from either direction to a predetermined position with regard to the frame.

20. In gyro apparatus of the character described a frame pivoted to a support, a gyro with a precession ring pivoted within the frame at a substantial angle to the pivotal axis of the frame and also to the spinning axis of the gyro, the said gyro being statically balanced upon its pivots, and resilient restraining means connected thereto for returning same upon its pivots from either direction to a predetermined position with regard to the frame.

21. In gyro apparatus of the character described a frame pivoted to a support, a pair of gyros each with a precession ring pivoted within the frame at a substantial angle to the pivotal axis of the frame and also to the spinning axis of the gyro, restraining means connected with each pivoted gyro within the frame for returning same upon its pivots from either direction to a predetermined position with regard to the frame and mechanical connections between the gyros for their simultaneous equal and opposite movement upon their respective pivots.

22. In gyro apparatus of the character described a frame pivoted to a support, a plurality of pivoted gyros within the frame each provided with a precession ring, the pivots standing at a substantial angle to the pivotal axis of the frame and also to the spinning axes of the gyros, and resilient restraining means connected with the pivoted gyros within the frame for returning same upon their pivots from either direction to a position where the spinning axes are parallel, or approximately parallel, to each other.

23. In gyro apparatus of the character described a frame pivoted to a support, a plurality of pivoted gyros within the frame each provided with a precession ring, the pivots standing at a substantial angle to the pivotal axis of the frame and also to the spinning axis of the gyros, and resilient restraining means connecting the two or more precession rings, for returning same upon their pivots from either direction to a position where the spinning axes are parallel, or approximately parallel, to each other.

24. In gyro apparatus of the character described a frame pivoted to a support, a plurality of gyros each having a precession ring pivoted within the frame at a substantial angle to the pivotal axis of the frame and also to the spinning axis of the gyros, the pivots of the precession rings upon the frame being parallel to each other, each of the gyros, including their precession rings, being in static equilibrium upon their pivots, and restraining means connected with one of the gyros within the frame for returning same upon its pivots from either direction to a predetermined position with regard to the frame, and mechanical connections between the gyros for their simultaneous movement upon their respective pivots.

25. In gyro apparatus of the character described a frame mounted upon a support for oscillation relative thereto, a pair of gyros mounted to oscillate upon parallel axes upon the frame, the said axes being at a substantial angle to the spinning axis of each gyro and a common means for centralizing both gyros upon their axes within the frame.

26. In gyro apparatus of the character described a frame mounted upon a support for oscillation relative thereto, a pair of gyros mounted upon the frame to precess upon axes which are substantially parallel to each other, means for rendering the system pendulous upon its outer or oscillating axis and means for centralizing the gyros upon their precessing axes.

27. In gyro apparatus of the character described a frame mounted upon a support for oscillation relative thereto, a pair of gyros mounted upon the frame to precess upon axes which are substantially parallel to each other, the gyros coupled for opposite precession upon such axes, means for rendering the system pendulous upon its outer or oscillating axis and means for centralizing the gyros upon their precessing axes.

28. In gyro apparatus of the character described a frame mounted upon a support for oscillation relative thereto, a pair of gyros mounted upon the frame to precess upon axes which are substantially parallel to each other, the gyros spinning in opposite directions and coupled together for opposite precession upon such axes, means for rendering the system pendulous upon its outer or oscillating axis and means for centralizing the gyros upon their precessing axes.

29. In a gyro apparatus of the character described a frame mounted upon a support for oscillation relative thereto, a pair of gyros mounted upon the frame to precess upon axes which are substantially parallel to each other, means for rendering the system pendulous upon its outer or oscillating axis and means for centralizing the gyros upon their precessing axes in a position in which their spinning axes are practically parallel to each other.

30. In gyro apparatus of the character described a frame mounted upon a support for oscillation relative thereto, upon a normally horizontal axis, a pair of gyros mounted upon the frame to precess upon normally vertical axes which are substantially parallel to each other, the system being pendulous upon its horizontal axis and means for centralizing the gyros upon their precession axes.

31. In gyro apparatus of the character described a frame mounted upon a support for oscillation relative thereto, a pair of gyros mounted upon the frame to precess oppositely upon axes which are substantially parallel to each other, the system being pendulous upon its outer or oscillating axis by the location of the said axis above the center of gravity of the combined apparatus.

32. In gyro apparatus of the character described a frame mounted upon a support for oscillation relative thereto, a pair of gyros mounted upon the frame to precess oppositely upon axes which are substantially parallel to each other, means for rendering the system pendulous upon its outer or oscillating axis and resilient means for centralizing the gyros upon their spinning axes.

33. In gyro apparatus, a supporting frame, a gyro adapted to spin upon a horizontal axis and to precess about a vertical axis, pivoted within said frame, guiding bearings for such vertical axis and an independent flexible suspension for the gyro within the frame.

34. In gyro apparatus, a supporting frame, a gyro adapted to spin upon a horizontal axis and to precess about a vertical axis, pivoted within said frame, guiding bearings for such vertical axis, an independent flexible suspension for the gyro within the frame, and a combined device for relieving said suspension of the weight thereof and of locking it to the frame at will.

35. In gyro apparatus, a supporting frame, a gyro adapted to spin upon a horizontal axis and to precess about a vertical axis, pivoted within said frame, guiding bearings for such vertical axis and a torsion suspending filament for the gyro within the frame whereby said gyro is both supported and centralized.

36. In gyro apparatus of the character described a frame mounted upon a support for oscillation relative thereto, upon a normally horizontal axis, a pair of gyros mounted in equilibrium upon the frame to precess upon normally vertical axes which are substantially parallel to each other, the system being pendulous upon its horizontal axis and resilient means for centralizing the gyros upon their precession axes.

37. In gyro apparatus, a frame pivoted on a support, a pair of gyros each having a bearing member pivoted within the frame at a substantial angle to the pivotal axis of the frame and also to the spinning axis of the gyros, the pivots of the two members being parallel to each other and the gyros being statically balanced about said pivots, and means for coupling the said bearing members for predetermined relative angular velocity upon their pivots within the frame.

38. In gyroscopic apparatus, a support, a frame which together with its contained parts is pendulously mounted upon said support for oscillation relative thereto, a gyroscope mounted upon said frame upon a precessional axis at a substantial angle to its spinning axis, and means whereby movement of said frame may be effected by applying a torque about the precessional axis of said gyroscope.

ELMER A. SPERRY.

Witnesses:
ALBERT W. STRINGHAM,
FRED C. NARVESEN.

zontal axis and to precess about a vertical axis, pivoted within said frame, guiding bearings for such vertical axis and a torsion suspending filament for the gyro within the frame whereby said gyro is both supported and centralized.

36. In gyro apparatus of the character described a frame mounted upon a support for oscillation relative thereto, upon a normally horizontal axis, a pair of gyros mounted in equilibrium upon the frame to precess upon normally vertical axes which are substantially parallel to each other, the system being pendulous upon its horizontal axis and resilient means for centralizing the gyros upon their precession axes.

37. In gyro apparatus, a frame pivoted on a support, a pair of gyros each having a bearing member pivoted within the frame at a substantial angle to the pivotal axis of the frame and also to the spinning axis of the gyros, the pivots of the two members being parallel to each other and the gyros being statically balanced about said pivots, and means for coupling the said bearing members for predetermined relative angular velocity upon their pivots within the frame.

38. In gyroscopic apparatus, a support, a frame which together with its contained parts is pendulously mounted upon said support for oscillation relative thereto, a gyroscope mounted upon said frame upon a precessional axis at a substantial angle to its spinning axis, and means whereby movement of said frame may be effected by applying a torque about the precessional axis of said gyroscope.

ELMER A. SPERRY.

Witnesses:
ALBERT W. STRINGHAM,
FRED C. NARVESEN.

---

Corrections in Letters Patent No. 1,186,856.

It is hereby certified that in Letters Patent No. 1,186,856, granted June 13, 1916, upon the application of Elmer A. Sperry, of New York, N. Y., for an improvement in "Gyroscopic Apparatus," errors appear in the printed specification requiring correction as follows: Page 6, line 50, claim 4, "gyro" should read *gyros;* page 8, line 71, claim 29, cancel the article "a"; page 9, line 31, claim 38, for the word "pendulously" read *pendulous;* and that the said Letters Patent should be read with these corrections therein that the same may conform to the record of the case in the Patent Office.

Signed and sealed this 6th day of March, A. D., 1917.

[SEAL.]

F. W. H. CLAY,
*Acting Commissioner of Patents.*

Cl. 74—78.

It is hereby certified that in Letters Patent No. 1,186,856, granted June 13, 1916, upon the application of Elmer A. Sperry, of New York, N. Y., for an improvement in "Gyroscopic Apparatus," errors appear in the printed specification requiring correction as follows: Page 6, line 50, claim 4, "gyro" should read *gyros;* page 8, line 71, claim 29, cancel the article "a"; page 9, line 31, claim 38, for the word "pendulously" read *pendulous;* and that the said Letters Patent should be read with these corrections therein that the same may conform to the record of the case in the Patent Office.

Signed and sealed this 6th day of March, A. D., 1917.

[SEAL.]

F. W. H. CLAY,

*Acting Commissioner of Patents.*

Cl. 74—78.